US008954877B2

(12) United States Patent
Adams et al.

(10) Patent No.: US 8,954,877 B2
(45) Date of Patent: Feb. 10, 2015

(54) PORTABLE ELECTRONIC DEVICE INCLUDING VIRTUAL KEYBOARD AND METHOD OF CONTROLLING SAME

(75) Inventors: Neil Patrick Adams, Waterloo (CA); Marek Andrzej Krzeminski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 343 days.

(21) Appl. No.: 13/458,711

(22) Filed: Apr. 27, 2012

(65) Prior Publication Data
US 2013/0286573 A1 Oct. 31, 2013

(51) Int. Cl.
*G06F 3/048* (2013.01)

(52) U.S. Cl.
USPC .......................................... 715/773

(58) Field of Classification Search
USPC .................................. 715/773, 864
See application file for complete search history.

(56) References Cited

U.S. PATENT DOCUMENTS

| 2011/0285631 | A1 | 11/2011 | Imamura et al. |
| 2011/0310019 | A1 | 12/2011 | Wilson |
| 2011/0316888 | A1 | 12/2011 | Sachs et al. |
| 2012/0030604 | A1 | 2/2012 | Kim et al. |

FOREIGN PATENT DOCUMENTS

| EP | 1903425 A1 | 3/2008 |
| EP | 2315110 A2 | 4/2011 |
| KR | 20100020851 A | 2/2010 |
| KR | 101118609 B1 | 2/2012 |

OTHER PUBLICATIONS http://kschang.hubpages.com/hub/Android-Softkeyboard-Shootout-which-input-method-should-you-use, Android Soft Keyboard Alternatives: Comparing 47 different (free) input methods from ABC Keyboard to ZetaType for Droid 85, Published at least as early as Apr. 27, 2012.
Extended European Search Report dated Sep. 7, 2012, issued in respect of corresponding European Patent Application No. 12165974.2.
Daniel Wigdor et al: "TiltText: Using Tilt for Text Input to Mobile Phones", Proceedings of the 16th annual ACM symposium on User interface software and technology, UIST '03, Jan. 1, 2003, pp. 81-90, XP55058681, New York, New York, USA DOI: 10.1145/964696.964705, ISBN: 978-1-58-113636-4.
Office Action dated Apr. 18, 2013, issued in respect of corresponding European Patent Application No. 12165974.2.
International Search Report and Written Opinion dated Jan. 18, 2013, issued against corresponding PCT patent application No. PCT/CA2012/000404.

*Primary Examiner* — Omar Abdul-Ali
(74) *Attorney, Agent, or Firm* — Geoffrey deKleine; Borden Ladner Gervais LLP

(57) ABSTRACT

A method includes displaying a keyboard on a display of an electronic device, detecting a tilt of the device, and when the detected tilt is associated with a keyboard transformation function, resizing one or keys of the keyboard.

17 Claims, 8 Drawing Sheets

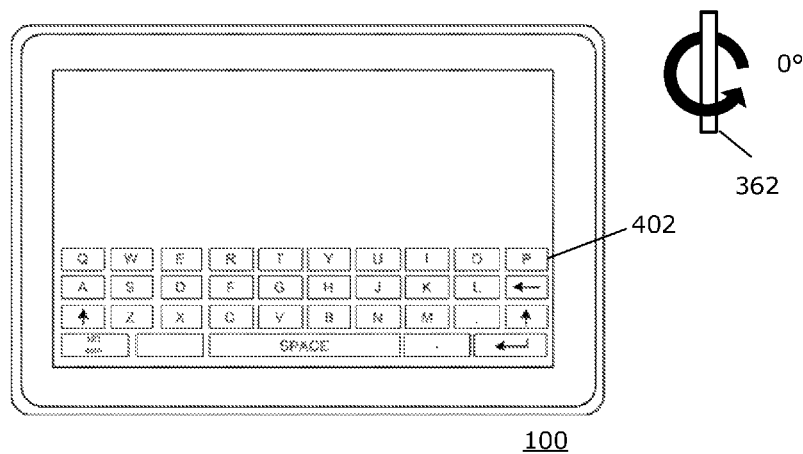
FIG. 8
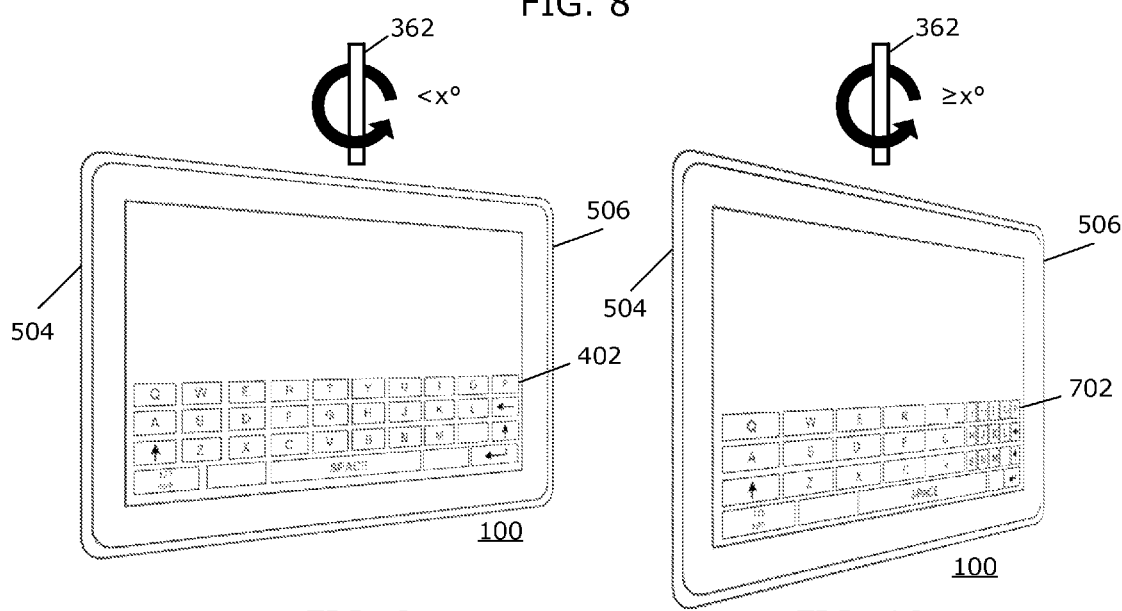
FIG. 9
FIG. 10

PORTABLE ELECTRONIC DEVICE INCLUDING VIRTUAL KEYBOARD AND METHOD OF CONTROLLING SAME

FIELD OF TECHNOLOGY

The present disclosure relates to electronic devices including, but not limited to, portable electronic devices having virtual keyboards and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and may have limited space for user input and output. The information displayed on the display may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached figures in which:

FIG. 4 through FIG. 14 are views illustrating examples of changing a virtual keyboard displayed on an electronic device in accordance with the method of FIG. 2.

DETAILED DESCRIPTION

Figure 1:
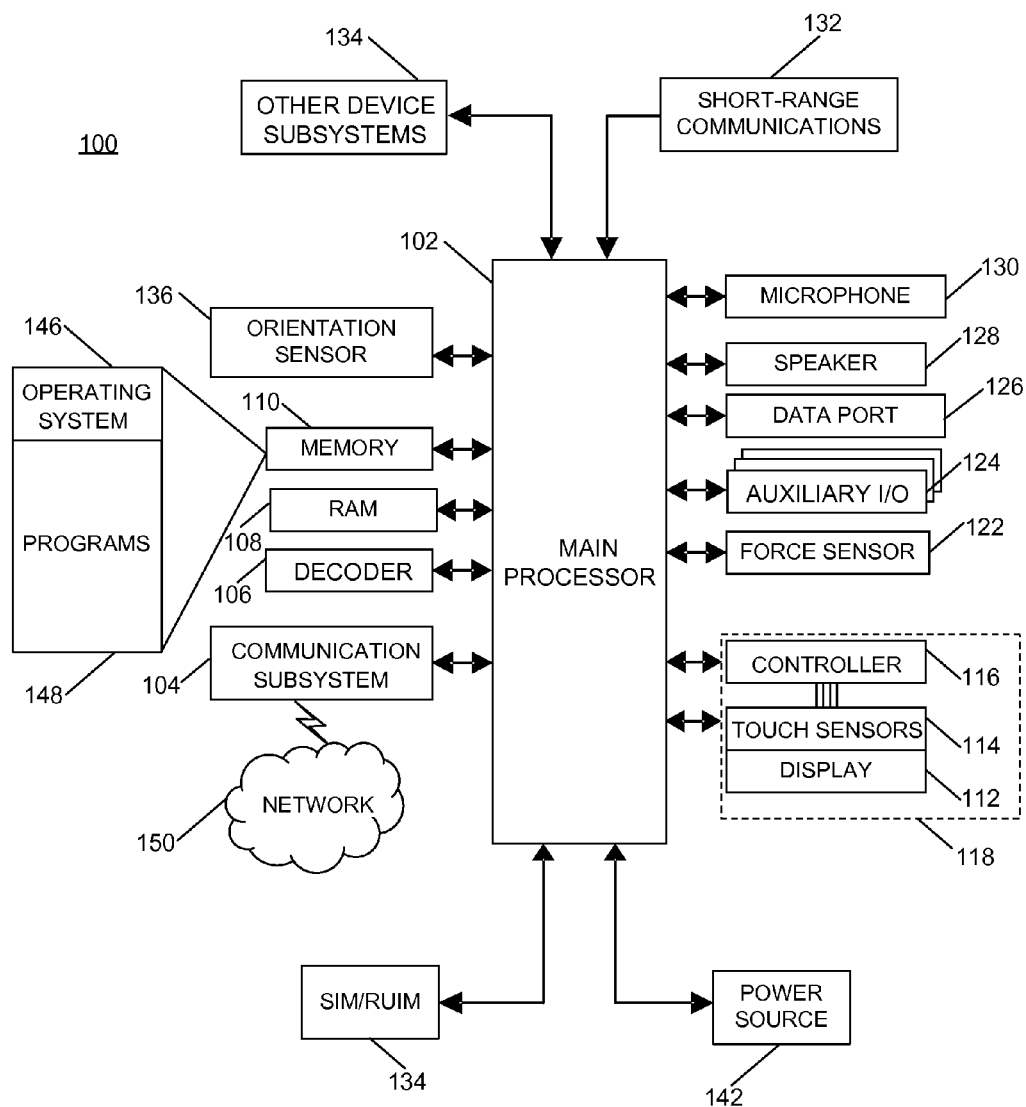
FIG. 1 is a block diagram of a portable electronic device in accordance with an example.

The following describes an electronic device and method including displaying a keyboard on a display of an electronic device, detecting a tilt of the device, and, when the detected tilt is associated with a keyboard transformation function, resizing one or more keys of the keyboard.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100, also referred to as an electronic device 100 or a device 100, is shown in FIG. 1. The electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. Optionally, the processor may interact with one or more force sensors 122.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The processor 102 may also interact with an orientation sensor 136, such as, for example, an accelerometer 137, to determine the tilt of the portable electronic device 100. For example, an accelerometer 137 may be utilized to detect direction of gravitational forces or gravity-induced reaction forces that may determine the tilt of the portable electronic device 100. More generally, the orientation sensor 136 is utilized to detect tilts, also known as tilt events, including any relative movements and changes of orientation of the device 100.

The term "tilt" is utilized to refer to a rotation, incline, tip, movement or change of the device 100 into a sloping or slanted position, and the like.

Figure 3:
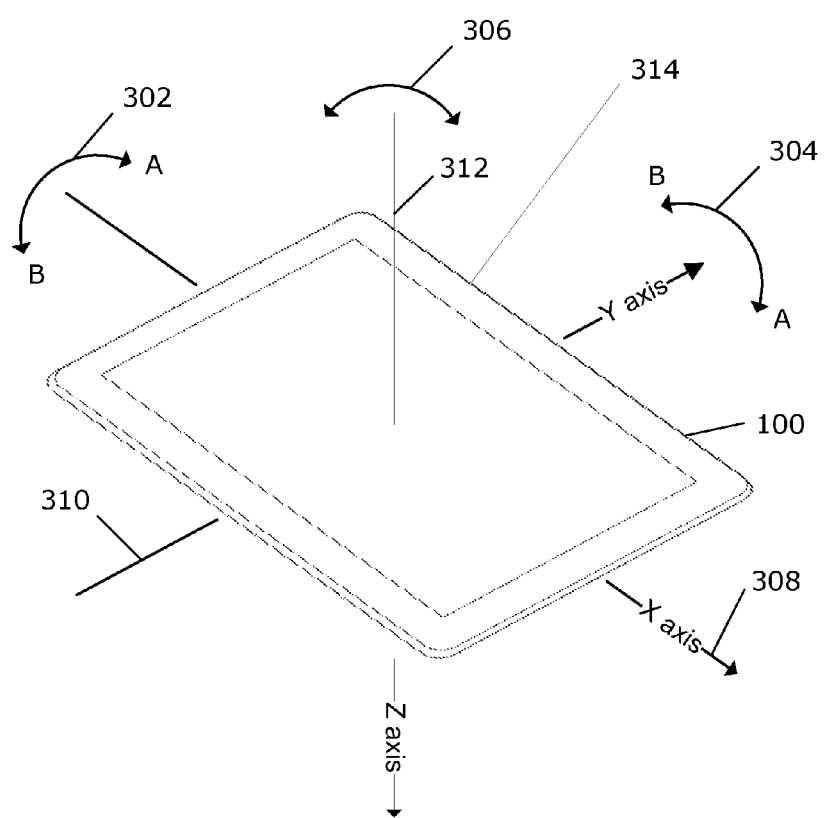
FIG. 3 is a perspective view of an example electronic device, illustrating three axes of relative movement along which the device may be tilted.

FIG. 3 illustrates three example axes of relative movement about which a device 100 may be tilted, namely axis 308 (hereinafter the X axis), axis 310 (hereinafter the Y axis), and axis 312 (hereinafter the Z axis). A tilt may be described by a tilt angle (or an angle of rotation or movement) representing the tilt about the X, Y, or Z axes in a three dimensional space.

When a device 100 is held in the orientation such that a top 314 is as depicted in FIG. 3, the user may tilt the device to the side (left or right), frontward (up, or pulled up forward), backward (down, or pushed back downward), or some combination of these directions. For the purpose of the present description, a sideward tilt, shown as 304 in FIG. 3, is a tilt about the Y axis. A sideward tilt to the right (a right tilt) is denoted by 304A and a left tilt is denoted by 304B. Frontward and backward tilts, shown as 302 in FIG. 3, are tilts about the X axis. A backward tilt is denoted by 302A and a frontward tilt is denoted by 302B. In this example, clockwise or counterclockwise tilts of the device, shown as 306 on FIG. 3, an example of which is a tilt from portrait to landscape orientation, are tilts about the Z axis. The device shown in FIG. 3 and following is in landscape orientation, meaning that for a generally rectangular device, a long side of the device is horizontal.

Figure 13:
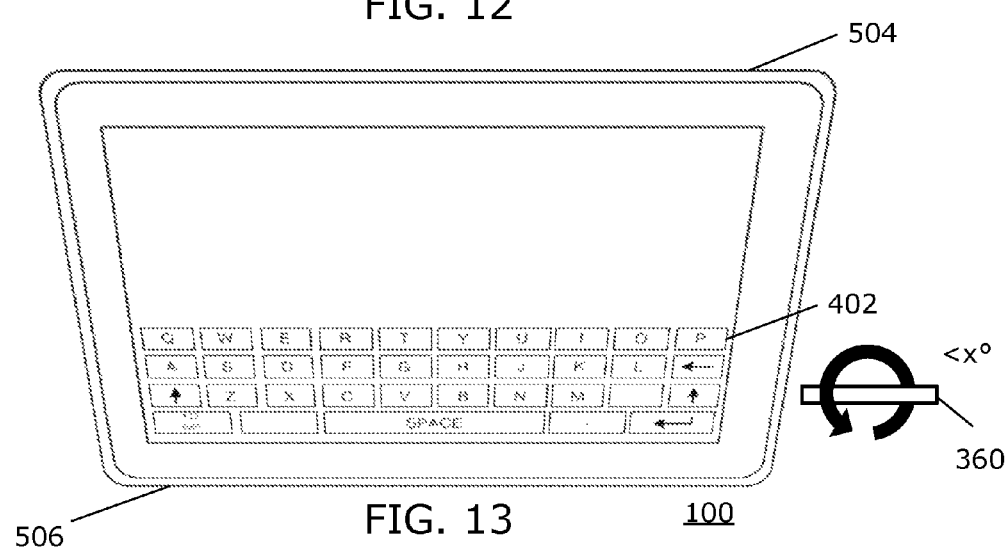

It will be appreciated that a tilt of the device 100 along one of the X or Y axes may result in one side of the device being "tilted up" with the opposite side of the device being "tilted down". Tilts about the Y axis cause a first, tilted up side 504 and a second, tilted down side 506 to be located on opposite sides of the device horizontally. Similarly, tilts about the X axis cause a first, tilted up side 504 and a second, tilted down side 506 to be located on opposite sides of the device vertically. Examples of tilts about the X and Y axes are illustrated in FIG. 9 and FIG. 13, respectively, and are discussed in greater detail below.

The orientation sensor 136 may be configured to detect tilts regardless of the starting position of the portable electronic device 100. For example, the starting position of the portable electronic device may be resting on a table or other flat surface, where one side of the device is generally parallel to the ground. Alternatively, the device may be oriented in a substantially frontward direction, with the touch-sensitive display 118 facing the user.

The orientation sensor 136 may be a three-axis accelerometer. Alternatively, the orientation sensor 136 may be a digital accelerometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA).

One or more tilts may be detected by the orientation sensor 136. The processor 102 may determine attributes of the tilt, including one or more tilt angles (as described above). Tilt data may include data from one or more orientation sensors 136. Multiple simultaneous or consecutive tilts may be detected.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at generally unchanged location over a period of time or a touch associated with the same selection item for a period of time.

Optional force sensors 122 may be disposed in conjunction with the touch-sensitive display 118 to determine or react to forces applied to the touch-sensitive display 118. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information associated with a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
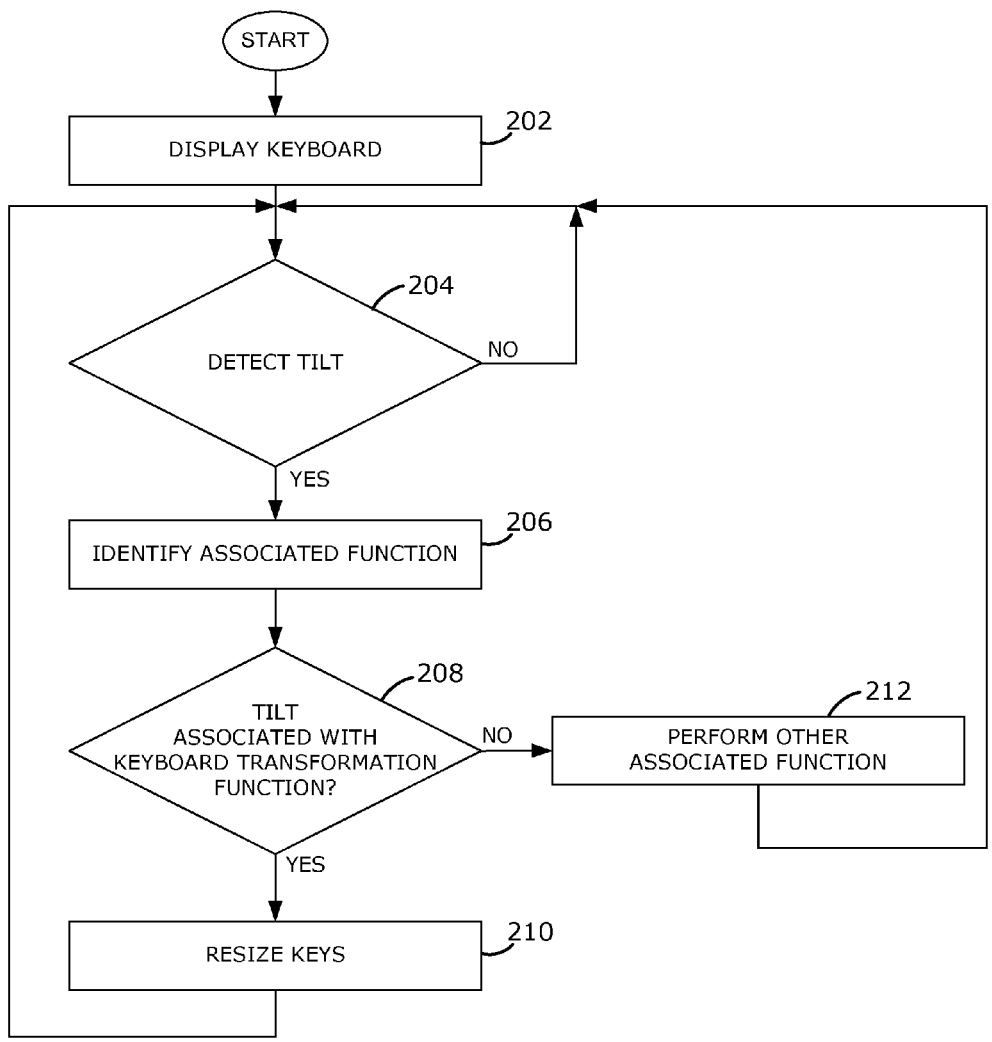
FIG. 2 is a flowchart illustrating an example of a method of changing a virtual keyboard displayed on an electronic device.

A flowchart illustrating an example of a method of changing a virtual keyboard displayed on an electronic device, such as the electronic device 100, is shown in FIG. 2. The method may be carried out by software executed by, for example, processor 102 and/or the controller 116. Coding of software for carrying out such a method is within the scope of a person of ordinary skill in the art given the present description. The method may contain additional or fewer processes than shown and/or described, and may be performed in a different order. Computer-readable code executable by at least one controller or processor of the portable electronic device to perform the method may be stored in a computer-readable storage medium, such as a non-transitory computer-readable medium.

A keyboard, also referred to as a keyboard layout, is displayed on the touch-sensitive display 118 at 202. The keyboard may be any suitable keyboard such as a QWERTY keyboard, QWERTZ keyboard, AZERTY keyboard, numeric keyboard or keypad, symbolic keyboard, and so forth. The keyboard includes a plurality of virtual keys, also referred to as keys, that are associated with characters, symbols, and the like, that may be entered utilizing the keyboard. The keyboard may be displayed in any suitable application. For example, the keyboard may be displayed for composition of a message in a messaging application. The keyboard may be displayed for entry of information in a data entry field in a Web browser application. The keyboard may be displayed for entry of information in other applications, such as a calendar application, a contacts or address book application, a word processing application, or any other suitable application.

Typically, keys on virtual keyboards may be small and hard to press, resulting in typographical errors. As well, when a device is used with one hand, it may be difficult for the user to reach across the virtual keyboard to press keys on the opposite side of the keyboard. The virtual keyboard may be particularly small when a device is used in portrait orientation because the width of the keyboard depends on the width of a short side of the device. As such, it is desirable to provide an improved virtual keyboard that addresses some of the above shortcomings, or to provide a useful alternative.

When a tilt is detected on the device at 204, the attributes of the tilt of the device 100 are determined. The attributes of the tilt may include one or more tilt angles. As described above with reference to FIG. 3, use of the term "tilt angles" may refer to the x, y, and z components representing the tilt of the device.

The tilt may be associated with a function and the function is identified at 206 of FIG. 2. The function associated with the tilt is dependent on the attributes of the tilt. For example, a tilt may be associated with a keyboard transformation function to change the keyboard by resizing the keys of the keyboard. Alternatively, a tilt may be associated with a function to scroll displayed information or to hide the keyboard. Slight tilts of the device, meaning tilts that do not meet a predetermined threshold, such as a predetermined tilt angle or angles, may not be associated with any functions. Slight tilts or movements may occur during use of the device and may not be associated with a keyboard transformation function to reduce the chance of performing an undesirable keyboard transformation function, for example, while gesturing on the device or moving with the device.

When the tilt is associated with a keyboard transformation function at 208, the process continues at 210. The keyboard transformation function is a function to change the keyboard by resizing the keys, for example, to increase or decrease the size of one or more keys. For example, the keyboard transformation function may increase or decrease the width of the keys, in response to the tilt and based on the tilt attributes. Alternatively, the keyboard transformation function may alter or change the size of the active areas associated with the keys. The active areas are the areas at which a selects the key. The size of the active areas may change without changing the displayed key size.

In one example, when the device 100 is tilted to the left (shown as 304B in FIG. 3), the user may be trying to access the keys on the right side of the keyboard. When the tilt of the device to the left is identified at 206 to be associated with a keyboard transformation function at 208, the keyboard is changed at 210 such that one or more keys proximate (located near) a first, tilted up side of the device are resized to be larger than one or more keys proximate a second, tilted down side of the device. In this example, the keyboard is changed at 210 to increase the size of the keys on the left side of the keyboard, i.e., the keys proximate a first, tilted up side of the device. The keyboard is also changed to reduce the size of the keys on the right side of the keyboard, i.e., the keys proximate a second, tilted down side of the device, to simulate an effect of gravity on the keys of the keyboard.

Figure 5:
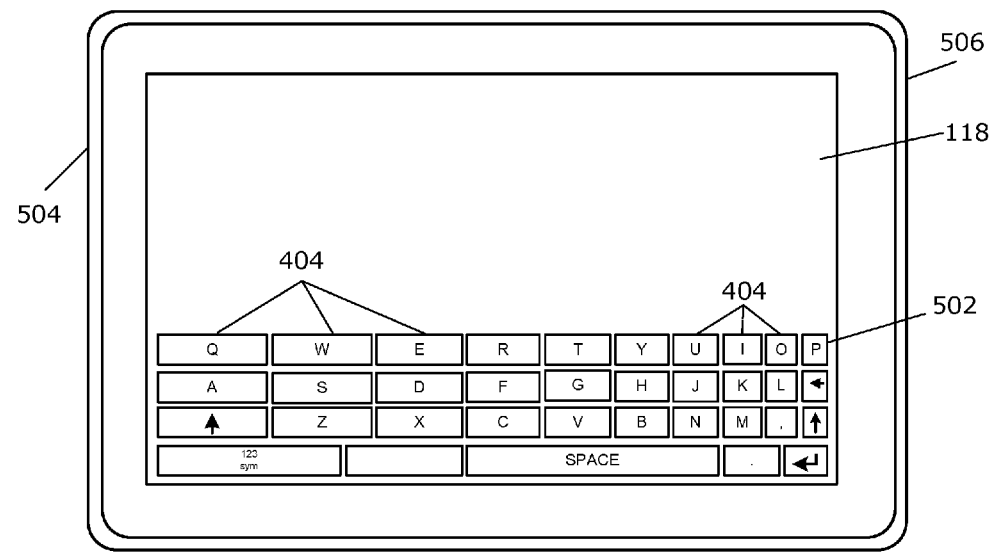

The resizing of the keys may be gradual, such that the key sizes gradually decrease in size from a first, tilted up side 504 of the keyboard to a second, tilted down side 506 of the keyboard, as shown, for example, in FIG. 5. Alternatively, the keys of the keyboard may be grouped and the resizing of the keys may be uniform within a group of the keyboard, such that all the keys in one group may be sized uniformly or by one factor (e.g. in the same proportion), as shown, for example, in FIG. 7.

Changing the keyboard by tilting the device left or right, or up or down, may be carried out without switching or interrupting tasks. For example, the size of the keys may be changed by tilting when encountering difficulty with a small keyboard. Such resizing of the keys may also facilitate easier one handed operation.

Other keyboards may also include greater or fewer numbers of keys. The locations of the keys may be changed by moving keys of the keyboard relative to other keys of the keyboard to accommodate the resizing of keys. The keys that are moved may move along their respective key paths. For example, when increasing the size of keys within a row, adjacent keys may move along a path within the row of keys. The keys of the keyboard may also be resized based on the available display width and/or based on the number of keys of the keyboard.

Other keyboard transformation functions may be utilized. For example, a numeric keypad may displayed in response to a tilt in one direction while a symbolic keyboard may be displayed in response to a tilt in another direction.

The resizing or movement of the keys may be animated at a rate or speed dependent on the tilt detected at 204. Thus, a slow tilt may be utilized to resize and move the keys slowly to new locations. A faster tilt may be utilized to resize and move the keys more quickly.

The change and movement of the keys along their respective key paths may be displayed on the touch-sensitive display 118 when the keyboard is changed. Ready identification of the new locations of keys is facilitated by graphically animating the resizing or movement of the keys during changing of the keyboard. For example, when a device is tilted left, the keys proximate the right side of the device (the first, tilted up side) may appear to grow in size and/or slide up, while the keys proximate the left side of the device (the second, tilted down side) may appear to shrink in size and/or slide down. Thus, a gravity effect is simulated graphically by animating the movement and resizing of the keys caused by the tilt.

When the tilt is not associated with a keyboard transformation function at 208, the process continues at 212 and a function associated with the tilt is performed. For example, the keyboard transformation function may be carried out or performed in response to sideward tilts. A keyboard transformation function may not respond to, for example, frontward and backward tilts. Thus, a function associated with the tilt at 212 may be a function other than a keyboard transformation function such as, for example a function to scroll displayed information, a function to hide the keyboard, or any other suitable function that may be associated with a tilt.

Figure 4:
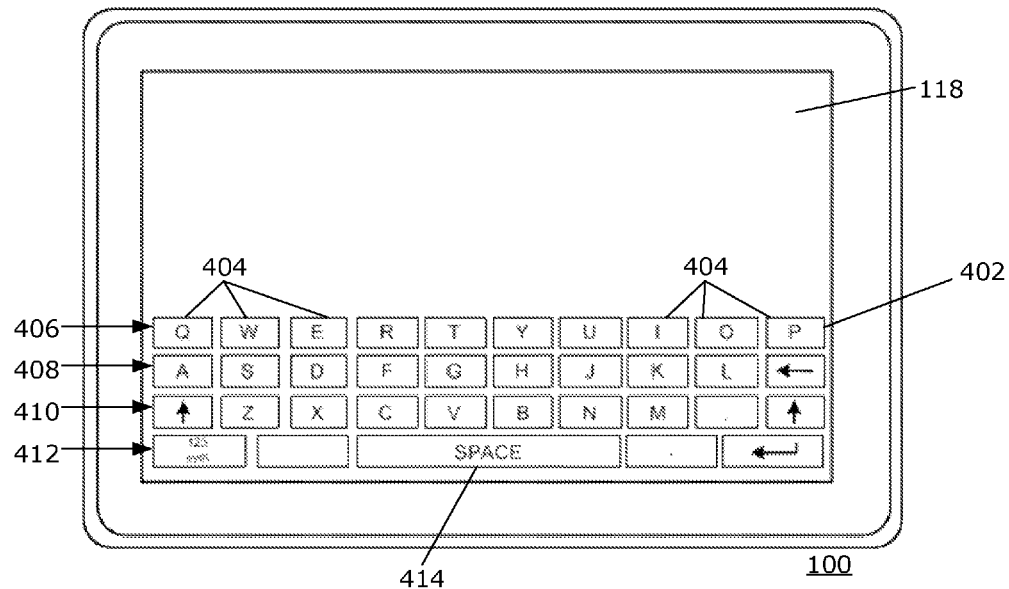

Examples of changing a keyboard displayed on an electronic device 100 are illustrated in FIG. 4 through FIG. 14 and described with continued reference to FIG. 2. In the front view of FIG. 4, a standard keyboard 402 is displayed on the touch-sensitive display 118 at 202. In the example of FIG. 4, the standard keyboard 402 is a QWERTY keyboard and includes four rows 406, 408, 410, 412 of keys 404. The row 412 includes a spacebar 414. The keys 404 of the keyboard are sized such that the rows 406, 408, 410, 412 of keys 404 fit the width of the touch-sensitive display 118, either in portrait or landscape orientation. For the purpose of this example, a landscape orientation is illustrated.

A tilt of the device 100 is detected at 204 and the attributes of the tilt, including, for example, the tilt angle or angles of tilt of the device 100, may be determined. In the examples illustrated in FIG. 4 through FIG. 14, the keyboard transformation function is a function to change the keyboard by changing the size of one or more of the keys 404, for example, to increase the size of keys proximate a first, tilted up side of the device 100. The keyboard is changed at 210. The change is illustrated in FIG. 6 through FIG. 10.

Figure 6:
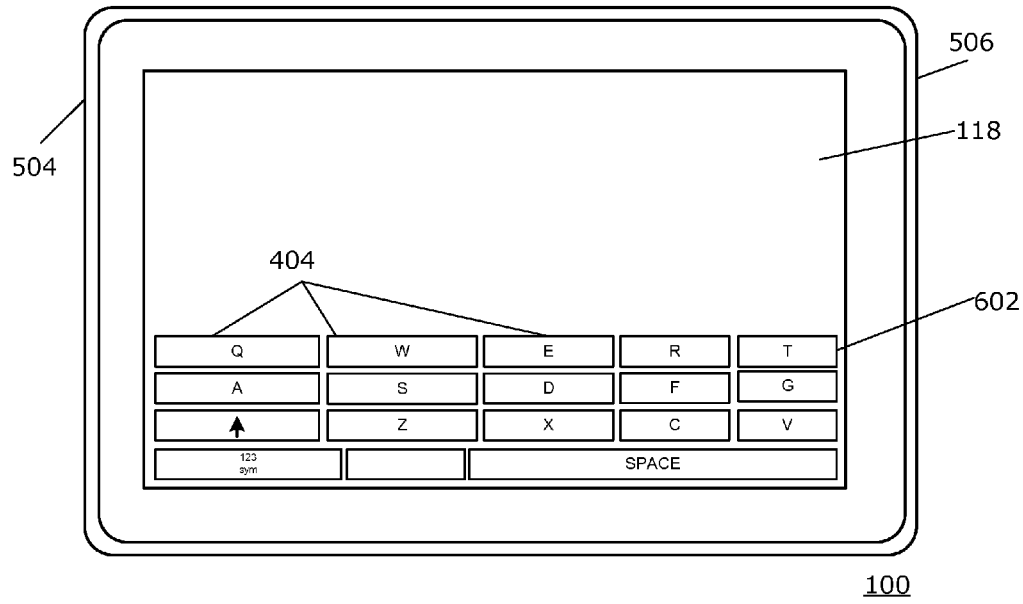

In the example illustrated in FIG. 5, the device 100 is tilted to the right, meaning that the left side of the device is the first, tilted up side 504, and the right side of the device is the second, tilted down side 506. Responsive to the tilt, a keyboard transformation function, identified at 206, changes the keyboard from the standard keyboard 402 to a keyboard 502. The keys of keyboard 502 are resized such that keys 404 proximate the first, tilted up side 504, are larger than the keys 404 proximate the second, tilted down side 506. In this example, the width of the keys 404 gradually decreases from left to right. The size of the keys 404 near the first, tilted up side 504 enlarged further by reducing the number of keys displayed, for example, by simulating a sliding movement such that a portion of the keyboard appears to slide out of view, as illustrated in FIG. 6.

Figure 7:
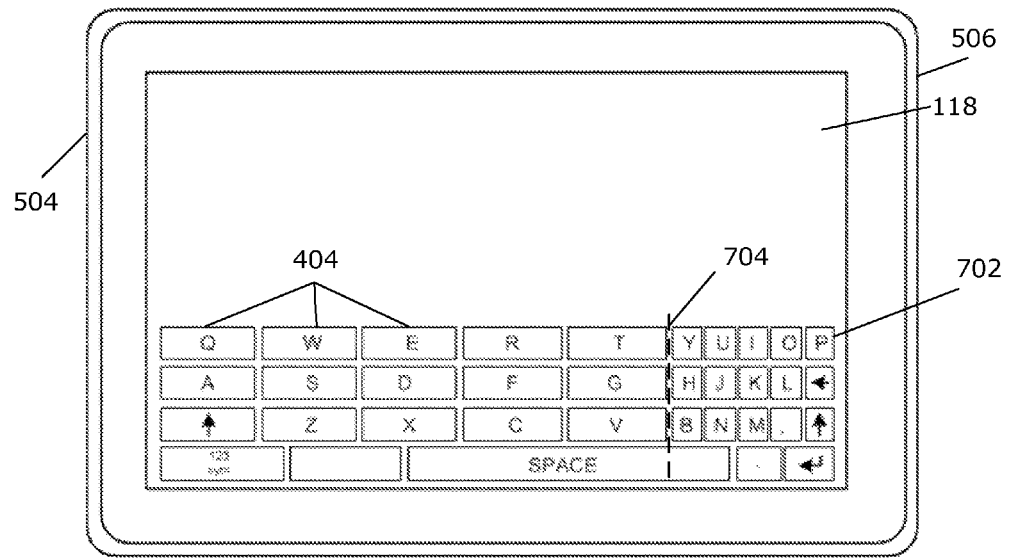

In the example shown in FIG. 7, the keyboard 702 is similar to the keyboard 502 but has been divided or segmented into two groups, in which, for example, a line 704, which may or may not be illustrated, is located between the "T" and "Y" keys and divides the keys into two groups. Responsive to a sideward tilt to the right, the group of keys to the left of the line 704 may be resized by one factor, while the group of keys to the right of line 704 may be resized by another factor. The keys may be divided into one or more groups, and the keys within one or more groups may be resized.

Figure 11:
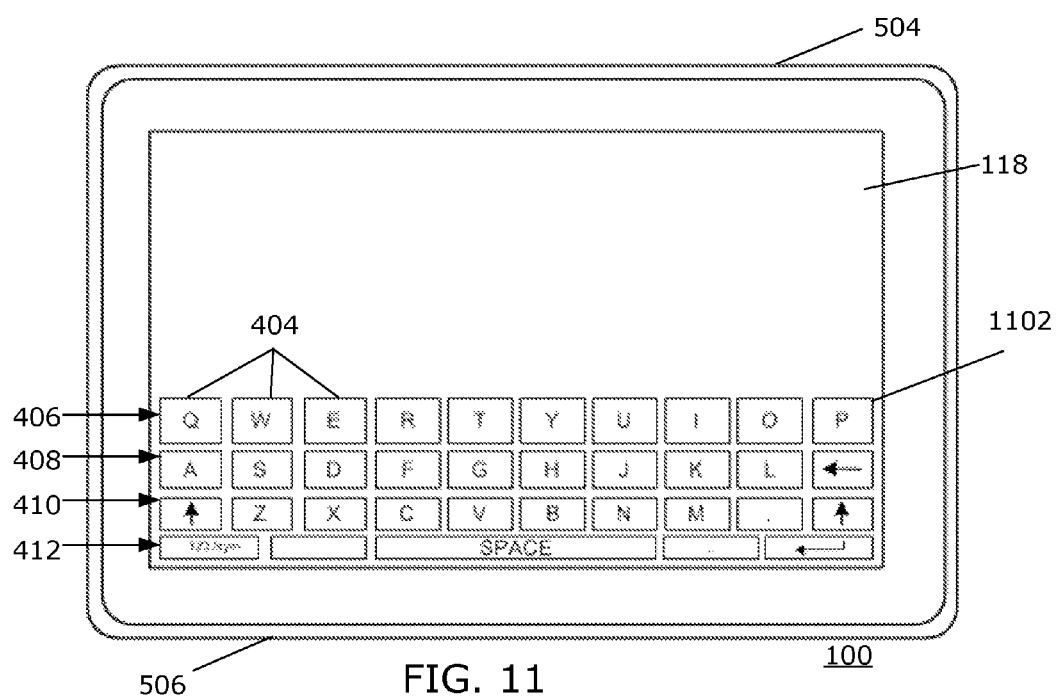

In the example illustrated in FIG. 11, the device is tilted frontward, meaning that the top side of the device is the first, tilted up side 504 and the bottom side of the device is the second, tilted down side 506. Responsive to the tilt, the keyboard transformation function, identified at 206, changes the keyboard from the standard keyboard 402 to a keyboard 1102. The four rows of keys 406, 408, 410, 412 of keys 404 are resized as shown in FIG. 11, respectively such that keys 404 proximate the first, tilted up side 504, are larger than the keys proximate the second, tilted down side 506. In this example, the height of the keys gradually decreases from top to bottom. Responsive to a frontward or backward tilt, a keyboard transformation function may change the keyboard by adding or removing an extra row of keys. For example, a row of numerical characters may be added or removed. Alternatively, letters of a keyboard may be capitalized.

In the example shown in FIG. 8 through FIG. 10, the standard keyboard 402 of the device 100 changes when the device 100 is tilted to the right. FIG. 8 shows the starting position of the device 100 and the standard keyboard 402. FIG. 9 shows a slight tilt of the device 100. The tilt is less than a predetermined tilt angle (shown as x°). The predetermined tilt angle is not met, and therefore the standard keyboard 402 remains the same as in FIG. 8. FIG. 10 shows that when a sideward tilt to the right meets or exceeds the predetermined tilt angle, the keyboard transformation function changes the from the standard keyboard 402 to a keyboard 702, described above with reference to FIG. 7. Upon the device 100 being tilted back to the starting position, the keyboard transformation function may then change the keyboard by returning to the standard keyboard 402.

Figure 12:
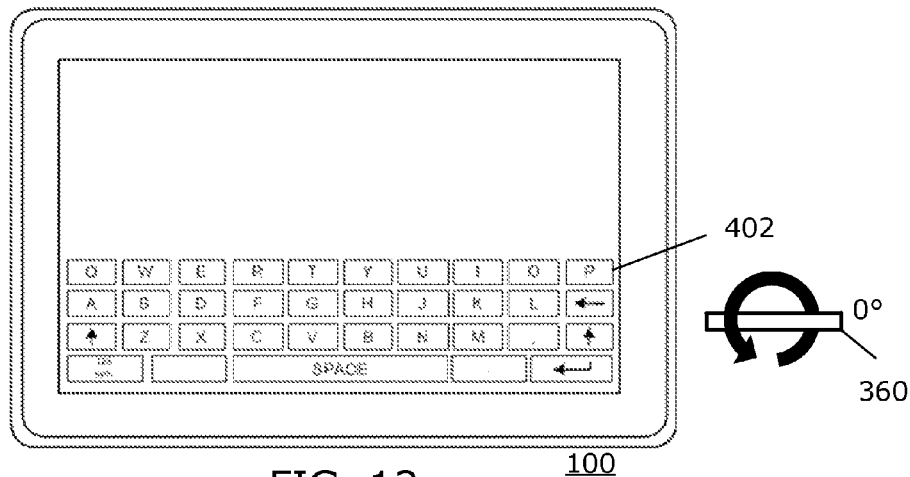
Figure 14:
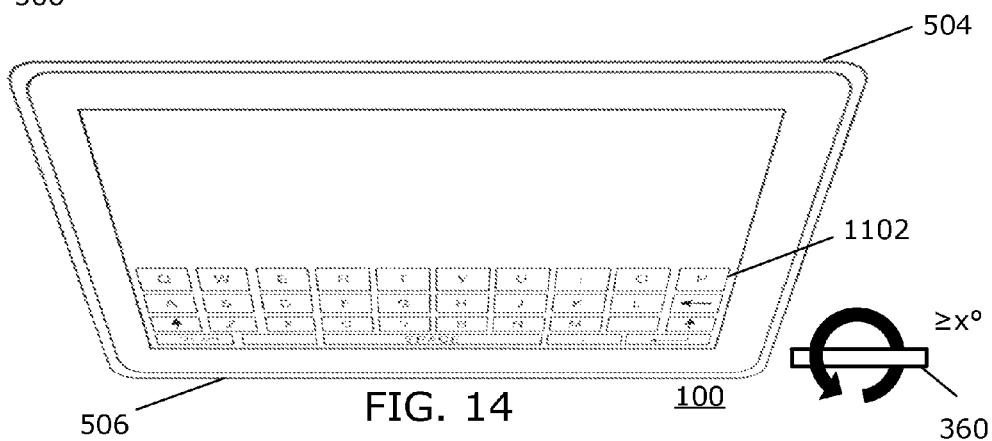

In the example shown in FIG. 12 through FIG. 14, the standard keyboard 402 of the device 100 changes when the device 100 is tilted frontward. FIG. 12 shows the starting position of the device 100 and the standard keyboard 402. FIG. 13 shows a slight tilt of the device 100. The tilt is less than a predetermined tilt angle (shown as x°). The predetermined tilt angle is not met, and therefore the standard keyboard 402 remains the same as in FIG. 12. FIG. 14 shows that when a frontward tilt meets or exceeds the predetermined tilt angle, the keyboard transformation function changes from the standard keyboard 402 to a keyboard 1102, described above with reference to FIG. 11. Upon the device 100 being tilted back to the starting position, the keyboard transformation function may then change the keyboard by returning to the standard keyboard 402.

In the examples described above with reference to FIG. 4 through FIG. 14, a keyboard is changed in response to a sideward tilt of the device, to enlarge or increase the size of the keys on the left side of the keyboard and to reduce the size of the keys on the right side of the keyboard (with reference to FIG. 5 through 7 and FIG. 8 through 10), and, in response to a frontward tilt of the device, to enlarge or increase the size of the keys on the top side of the keyboard and to reduce the size of the keys on the bottom side of the keyboard (with reference to FIG. 11 through 14).

A method includes displaying a keyboard on a display of an electronic device, detecting a tilt of the device, and when the detected tilt is associated with a keyboard transformation function, changing the keyboard by resizing one or more keys of the keyboard.

An electronic device includes a touch-sensitive display and at least one processor coupled to the touch-sensitive display and configured to display a keyboard on a display of an electronic device, to detect a tilt of the device, and, when the detected tilt is associated with a keyboard transformation function, to change the keyboard by resizing one or more keys of the keyboard.

The resizing may include changing the width of the keys. One or more keys proximate a first, tilted up side of the device may be resized to be larger than one or more keys proximate a second, tilted down side of the device to simulate an effect of gravity on the keys of the keyboard. The detected tilt may be associated with a keyboard transformation function when the detected title is a sideward, frontward, or backward tilt, or when the detected tilt meets a predetermined threshold or predetermined tilt angle. The resizing may be animated at a rate dependent on the tilt detected. The keys may gradually decrease in size from a first, tilted up side to a second, tilted down side. Alternatively, the keys of the keyboard may be divided into one or more groups, and all keys within one group may be resized. All keys within one group may be resized by one factor. The number of keys of the keyboard may be reduced, with the reduced keyboard including keys from a tilted up side of the device. Changing the keyboard may include graphically animating the resizing or movement of the keys during changing of the keyboard. The keyboard may be resized according to the available display width, and may be in a portrait or landscape orientation.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   displaying a keyboard on a display of an electronic device;
   detecting a tilt of the device, which tilt is associated with a keyboard transformation function; and
   when the detected tilt is in a first direction, resizing one or more keys of the keyboard;
   when the detected tilt is in a second direction, which second direction is different from the first direction, capitalizing the letters on the keys of the keyboard.

2. The method according to claim 1, wherein the resizing comprises changing the width of the keys.

3. The method according to claim 1, wherein one or more keys proximate a first tilted up side of the device are resized to be larger than one or more keys proximate a second tilted down side of the device to simulate an effect of gravity on the keys of the keyboard.

4. The method according to claim 2, wherein the detected tilt is associated with a keyboard transformation function when the detected tilt comprises a sideward tilt.

5. The method according to claim 2, wherein the detected tilt is associated with a keyboard transformation function when the detected tilt comprises one of a frontward or backward tilt.

6. The method according to claim 2, wherein the keys gradually decrease in size from the first, tilted up side to the second, tilted down side.

7. The method of claim 1, wherein the detected tilt is associated with a keyboard transformation function when the detected tilt meets a predetermined threshold.

8. The method of claim 7, wherein the predetermined threshold is a predetermined tilt angle.

9. The method according to claim 1, wherein the resizing is animated at a rate dependent on the tilt detected.

10. The method according to claim 1, wherein the keys of the keyboard are divided into one or more groups, and resizing comprises resizing all keys within one group.

11. The method according to claim 10, wherein all keys within one group are resized by one factor.

12. The method according to claim 1, wherein resizing comprises graphically animating a change in size or movement of the keys.

13. The method according to claim 1, wherein the keyboard is resized according to the available display width.

14. The method according to claim 1, wherein the keyboard is in a portrait orientation.

15. The method according to claim 1, wherein the keyboard is in a landscape orientation.

16. A non-transitory computer-readable medium having computer-readable code executable by at least one processor of a portable electronic device to perform the method according to claim 1.

17. An electronic device comprising:
   a touch-sensitive display;
   at least one processor coupled to the touch-sensitive display and configured to:
      display a keyboard on the touch-sensitive display;
      detect a tilt of the device, which tilt is associated with a keyboard transformation function;
      when the detected tilt is in a first direction, resize one or more keys of the keyboard; and
      when the detected tilt is in a second direction, which second direction is different from the first direction, capitalizing the letters on the keys of the keyboard.

* * * * *